(12) United States Patent
Krausz et al.

(10) Patent No.: US 11,836,698 B2
(45) Date of Patent: Dec. 5, 2023

(54) SYSTEMS AND METHODS FOR AUTHENTICATING A USER COMMERCE ACCOUNT ASSOCIATED WITH A MERCHANT OF A COMMERCE PLATFORM

(71) Applicant: Stripe, Inc., South San Francisco, CA (US)

(72) Inventors: Brian David Krausz, South San Francisco, CA (US); Jieren Chen, South San Francisco, CA (US); Shreyas Surendra Doshi, South San Francisco, CA (US); Michael Villar, South San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 17/987,526

(22) Filed: Nov. 15, 2022

(65) Prior Publication Data

US 2023/0076749 A1 Mar. 9, 2023

Related U.S. Application Data

(63) Continuation of application No. 17/314,887, filed on May 7, 2021, now Pat. No. 11,501,310, which is a (Continued)

(51) Int. Cl.
*H04W 12/06* (2021.01)
*G06Q 20/40* (2012.01)
*G06Q 20/32* (2012.01)
*G06Q 20/38* (2012.01)
(Continued)

(52) U.S. Cl.
CPC ....... *G06Q 20/322* (2013.01); *G06Q 20/3829* (2013.01); *G06Q 20/401* (2013.01);
(Continued)

(58) Field of Classification Search
CPC . G06Q 20/405; G06Q 20/3829; H04W 12/06; H04W 12/04; H04L 63/08; H04L 63/18
(Continued)

(56) References Cited

U.S. PATENT DOCUMENTS 8,701,014 B1 * 4/2014 Schlegel ................. H04L 51/42
715/971
9,509,672 B1 * 11/2016 Barak ................. H04L 63/0815
(Continued)

OTHER PUBLICATIONS

Authorization Mechanisms for Mobile Commerce Implementations in Enhanced Prepaid Solutions Yigang Cai, Jack Kozik, Helmut L. Raether, John B. Reid, Guy H. Starner, Sunil Thadani, and Kumar V. Vemuri (Year: 2004).*
(Continued)

*Primary Examiner* — William E Rankins
(74) *Attorney, Agent, or Firm* — Womble Bond Dickinson (US) LLP

(57) ABSTRACT

A method and apparatus for authenticating a user commerce account associated with a merchant of a commerce platform are described. The method may include initiating authentication of the user commerce account associated with the merchant of the commerce platform from a commerce platform user interface of a user device, the user commerce account established for a user of the merchant. The method may also include sending an electronic message to a mobile device associated with the user account at the commerce platform, wherein the electronic message comprises an authentication code, and receiving the authentication code from the commerce platform user interface. Furthermore, the method may include generating an authentication key for the mobile device in response to matching the received authentication code with the sent authentication code and receiving a cookie provided from the commerce platform to the mobile device.

20 Claims, 18 Drawing Sheets

Related U.S. Application Data continuation of application No. 16/550,645, filed on Aug. 26, 2019, now Pat. No. 11,004,084, which is a continuation of application No. 15/711,921, filed on Sep. 21, 2017, now Pat. No. 10,395,254, which is a continuation of application No. 15/276,334, filed on Sep. 26, 2016, now Pat. No. 9,779,405.

(51) Int. Cl.
  *H04L 9/40* (2022.01)
  *H04W 12/041* (2021.01)
  *H04W 12/04* (2021.01)

(52) U.S. Cl.
  CPC ............ *G06Q 20/405* (2013.01); *H04L 63/08* (2013.01); *H04W 12/041* (2021.01); *H04W 12/06* (2013.01); *H04L 63/061* (2013.01); *H04L 63/168* (2013.01); *H04L 63/18* (2013.01); *H04W 12/04* (2013.01)

(58) Field of Classification Search
  USPC ................ 726/2, 17, 21; 713/155; 705/44
  See application file for complete search history.

(56) References Cited

U.S. PATENT DOCUMENTS

| | | | | |
|---|---|---|---|---|
| 9,779,405 | B1* | 10/2017 | Krausz | H04W 12/041 |
| 2008/0098225 | A1* | 4/2008 | Baysinger | H04L 9/3215 |
| | | | | 713/168 |
| 2008/0134295 | A1* | 6/2008 | Bailey | G06F 21/30 |
| | | | | 726/4 |
| 2010/0010932 | A1* | 1/2010 | Law | G06Q 20/3823 |
| | | | | 705/42 |
| 2010/0299524 | A1* | 11/2010 | Xia | H04W 12/06 |
| | | | | 713/168 |
| 2014/0317410 | A1* | 10/2014 | Yamaguchi | H04L 63/08 |
| | | | | 726/4 |
| 2015/0269580 | A1* | 9/2015 | Subramanian | G06Q 20/4016 |
| | | | | 705/44 |

OTHER PUBLICATIONS

NFC Mobile Transactions and Authentication based on GSM Network, W. Chen, G.P. Hancke and K.E. Mayes, et al. (Year: 2010).*

* cited by examiner

SYSTEMS AND METHODS FOR AUTHENTICATING A USER COMMERCE ACCOUNT ASSOCIATED WITH A MERCHANT OF A COMMERCE PLATFORM

PRIORITY

The present patent application is a continuation of corresponding U.S. patent application Ser. No. 17/314,887, filed on May 7, 2021, which is a continuation of corresponding U.S. patent application Ser. No. 16/550,645, filed on Aug. 26, 2019, which is a continuation of corresponding U.S. patent application Ser. No. 15/711,921, filed on Sep. 21, 2017, which is a continuation of corresponding U.S. patent application Ser. No. 15/276,334, filed on Sep. 26, 2016, the disclosures of which are incorporated herein by reference in their entirety.

BACKGROUND

Merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc.

These merchants, although providing a system for supplying products and/or services to consumers through their agents, often do not perform the financial processing associated with the merchant transactions. Instead, merchants utilize commerce systems to process financial transactions for the products and/or services provided to consumers through their agents. This may include the agent establishing an account with the merchant and then establishing an account with the commerce system. Once the accounts are established, the agent can accept payments from customers of the merchant for provided products and/or services, and the commerce system processes the accepted payments. This processing may include running credit cards, crediting a merchant account for the transaction, crediting the agent responsible for the transaction, debiting a commerce system fee for processing the transaction on behalf of the merchant, as well as performing other commerce related transactions for the merchant and/or agent such as providing payouts for products/services rendered on behalf of a merchant.

One significant problem with the above described process of performing transactions for a merchant through an agent includes verifying the identities of the agents and/or devices that the agent uses during transactions with the consumers. That is, since financial and/or other sensitive consumer information may be handled by the agent of the merchant, it is very important that the identity of the agent be established, and that the device the agent uses to process merchant transactions is the actual device associated with the agent providing the merchant products/services.

SUMMARY

The present disclosure is directed to enabling the authentication of a user commerce account associated with a merchant of a commerce platform, substantially as shown in and/or described in connection with at least one of the figures, as set forth more completely in the claims.

In an exemplary embodiment, a user commerce account associated with a merchant of a commerce platform is authenticated. The authentication begins by initiating authentication of the user commerce account associated with the merchant of the commerce platform from a commerce platform user interface of a user device. This user commerce account can be established for a user of the merchant. An electronic message, including an authentication code, may then be sent to a mobile device associated with the user account at the commerce platform. The authentication code is then received from the commerce platform user interface. If the sent and received authentication codes are matched by the commerce platform, and an authentication cookie indicating a successful matching is also received by the commerce platform, an authentication key is generated for the mobile device. The authentication key is provided to the mobile device and serves as an authentication, to the commerce platform, of user mobile device on behalf of the user commerce account when interacting with the commerce platform through a merchant application.

In another embodiment, the user may be an existing user of the commerce platform with one or more commerce platform accounts for the same and/or different merchants. That is, an existing user may have a second user commerce account associated with a second merchant of the commerce platform prior to initiation of the authentication. Thus, the existing user is authenticated to the commerce platform for the merchant to establish their new account. Because the user has multiple accounts with the commerce platform, separate records are maintained for the existing user at the user commerce platform for each of the different user commerce accounts.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
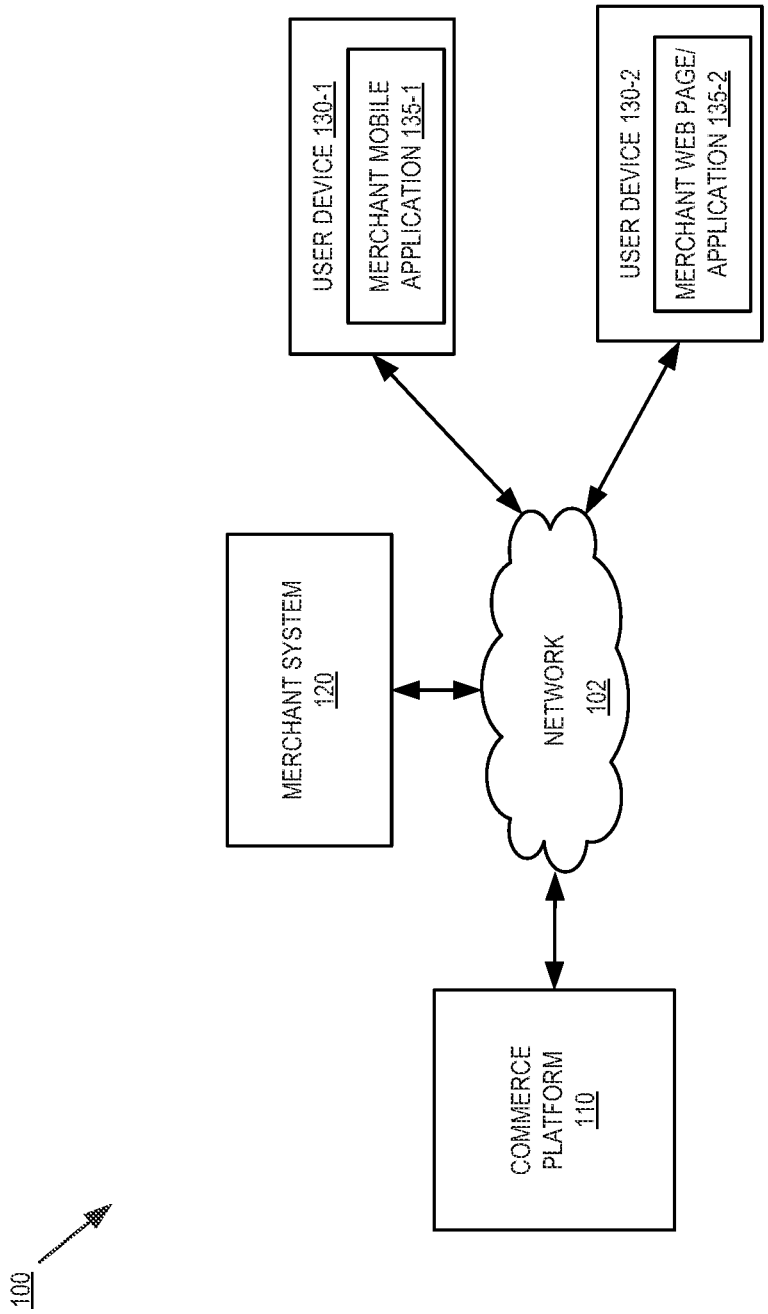
FIG. 1 is a block diagram of an exemplary system architecture for authenticating a user commerce account associated with a merchant of a commerce platform.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating", "receiving", "authenticating", "aggregating", "directing", "redirecting", "associating", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture for authenticating a user commerce account associated with a merchant of a commerce platform.

In one embodiment, the system 100 includes one or more user computer systems, such as user device 130-1 and user device 130-2, a merchant system 120, and a commerce platform 110. In one embodiment, user device 130-1 is a mobile computing device, such as a smartphone, tablet computer, smartwatch, etc., and the user device 130-2 is a different user computer system, such as a desktop computer system, laptop computer system, etc. The merchant system 120 and commerce platform 110 may also be computing devices, such as one or more server computer systems, desktop computer systems, etc.

The user device 130-1, user device 130-2, merchant system 120, and commerce platform 110 may be coupled to a network 102 and communicate with one another using any of the standard protocols for the exchange of information. In one embodiment, one or more of the user device 130-1, user device 130-2, merchant system 120, and commerce platform 110 may run on one Local Area Network (LAN) and may be incorporated into the same physical or logical system, or different physical or logical systems. Alternatively, the user device 130-1, user device 130-2, merchant system 120, and commerce platform 110 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, merchant system 120 is responsible providing a system through which services and/or products are provided to consumers (e.g., the customers of the merchant). The merchant system 120 may, for example, provide a system through which laundry service, food delivery, transportation, personal service, etc. may be supplied to a consumer. Such services and/or products can be provided to the consumer via a merchant website 135-2 provided through merchant system 120, a mobile application 135-1 developed or distributed by the merchant system 120 that enables a consumer to order merchant products and/or services, as well as other forms of providing products and services of the merchant system 120.

In one embodiment, merchant system 120 only provides the system through which the service and/or products are provided, and utilizes agents to actually provide the service and/or product. In the embodiments discussed herein, an agent of the merchant system 120 is the user of user device 130-1 and/or user device 130-2. Although FIG. 1 illustrates devices 130-1 and 130-2 used by a user, merchant system 120 may employ any number of agents for providing the services and/or products of the merchant system 120. Furthermore, as discussed herein, the commerce platform 110 may support any number of merchant systems and any number of users associated with one or more of the supported merchant systems.

In embodiments, the user of user device 130-1 and/or 130-2 communicates with merchant system through a merchant mobile application 135-1 executing on user device 130-1 and/or a merchant web page/application 135-2 executing on 135-2. The merchant applications, in embodiments discussed herein, provide an interface for establishing communication between the corresponding user device and the merchant system 120 to enable the user to provide a service on behalf of the merchant, deliver a product to a customer of the merchant, etc. For example, the merchant applications (e.g., application 135-1 and/or 135-2) receive updates from the merchant system 120, such as available jobs, establish preference setting for upcoming jobs, establish an account with the merchant system 120 that associates a user of the user device 130-1 and/or 130-2 with the merchant system 120, as well as other functions. Furthermore, the merchant mobile application 135-1 and merchant web page/application 135-2 provide the user interface through which the user can interact with the merchant system 120.

In one embodiment, merchant system 120 does not handle financial transactions for the product and/or services which are provided by the agents of merchant. That is, when a product or service of the merchant system 120 is provided to a consumer by an agent/user, the merchant system 120 does not receive consumer payment information (e.g., credit card information, digital asset information, etc.), process payments from accounts associated with the payment information, credit the merchant upon successful payment collection, credit the agent/user upon successful payment collection, etc. Instead, merchant system 120 utilizes the services of commerce platform 110 to perform the financial transactions and/or processing when a merchant system 120 service and/or product is provides to a consumer by a merchant's agent.

In one embodiment, commerce platform 110 is a distributed commerce platform that is responsible for maintaining one or more accounts for merchant system 120, such as accounts that associate merchant systems with banking systems, identify service terms between the merchant system 120 and the commerce platform 110, identify how to credit agents of a merchant, identify a fee associated with each transaction processed by commerce platform 110, etc. Commerce platform 110, in embodiments, further maintains financial accounts for the agents/users of merchant system 120, which are accounts that associate specific mobile devices (e.g., user device 130-1, user login credentials, user security keys, etc.), with the agents/users of merchant system 120. Once the merchant accounts and user accounts are established on commerce platform 110, a user of mobile device 130-1 and/or user device 130-2 may provide products and/or services on behalf of merchant system 120, including receiving payments from consumers, providing payment information to commerce platform 110, providing payments to merchant system 120 and/or a user account associated with a user of user device(s) 130-1 and/or 130-2, as well as receiving payouts for services rendered, goods delivered, or performance of other functions on behalf of the merchant system 120.

In one embodiment, a user of user device 130-1 or user device 130-2 may initiate the establishment of a user account with commerce platform 110 through merchant mobile application 135-1 or merchant web page/application 135-2. In one embodiment, a user interface of the merchant application 135-1 or 135-2 redirects the user to a website or application of the commerce platform 110, which may include passing the commerce platform 110 certain identification information that identifies the merchant system 120 for which the user account is to be associated with.

In one embodiment, upon receiving the redirection of a user from a merchant application, commerce platform 110 initiates an authentication process by causing the user device 130-1 or user device 130-2 to display a commerce platform user authentication interface. As discussed in greater detail below, the commerce platform user authentication interface redirects the interface of the user device 130-1 or 130-2, and is responsible for prompting a user of user device 130-1 and/or user device 130-2 for information (e.g., authentication challenges), receiving user response (e.g., authentication responses), and then upon successful authentication of a user and user device, supplying a key to the merchant application running on a mobile user device 130-1. Furthermore, the authentication process may also include the commerce platform 110 receiving additional user information after successfully authenticating a user's mobile device 130-1, such as receiving user account information, user financial information for distributing payments to a user, etc. As discussed herein, the authentication challenges and response may include more than one challenge and response (e.g., challenges for mobile device phone numbers, cookies showing device state, third party identity validations such as O-Auth, encryption key exchanges, etc.), thereby providing a multi-factor authentication of the user and user device 130-1 to commerce platform 110 before a user account associated with merchant system 120 may be established. In one embodiment, for example, a first authentication factor can include supplying and authenticating a cookie that serves to identify the owner of a device, and a second authentication factor can include supplying and authenticating an authentication key that is used by a merchant application (e.g., merchant mobile application 135-1 or merchant web page/application 135-2) when interacting with the commerce platform 110. In embodiments, the authentication process, once completed, ensures that the user account being established on commerce platform 110 is for the actual user of user device 130-1, and not a false or spoofed account.

In one embodiment, after the authentication process is completed successfully, commerce platform 110 provides an authentication key to user device 130-1 that merchant mobile application 135-1 utilizes when later interacting with commerce platform 110. The authentication key establishes the identity of the user of user device 135-1 to commerce platform 110 as being a valid user device for which transactions may be accepted and processed. Furthermore, after providing the authentication key to user device 130-1, a user interface of the user device 130-1 or user device 130-2, used to establish the user account, is redirected back to the merchant mobile interface 135-1 or the merchant web page/application 135-2. The user is then able to conduct transactions on behalf of merchant system 120, receive consumer payment information, and receiving remuneration for services performed and/or products provided.

As discussed herein, users/agents of the merchant system 120 may establish user accounts with commerce platform on either their associated mobile user device (e.g., user device 130-1) or other computing device (e.g., user device 130-2). The user authentication, however, is a process performed by commerce platform 110 for establishing the identity of the user of a mobile device (e.g., user device 130-1), which will be the device the user utilizes to collect payment information from consumers while performing merchant services or providing merchant products. Thus, after the authentication process is performed, the user may act as an agent on behalf of the merchant system 120 and receive payment from consumers through the merchant mobile application 135-1 utilizing transaction processing services of the commerce platform 110.

Figure 2:
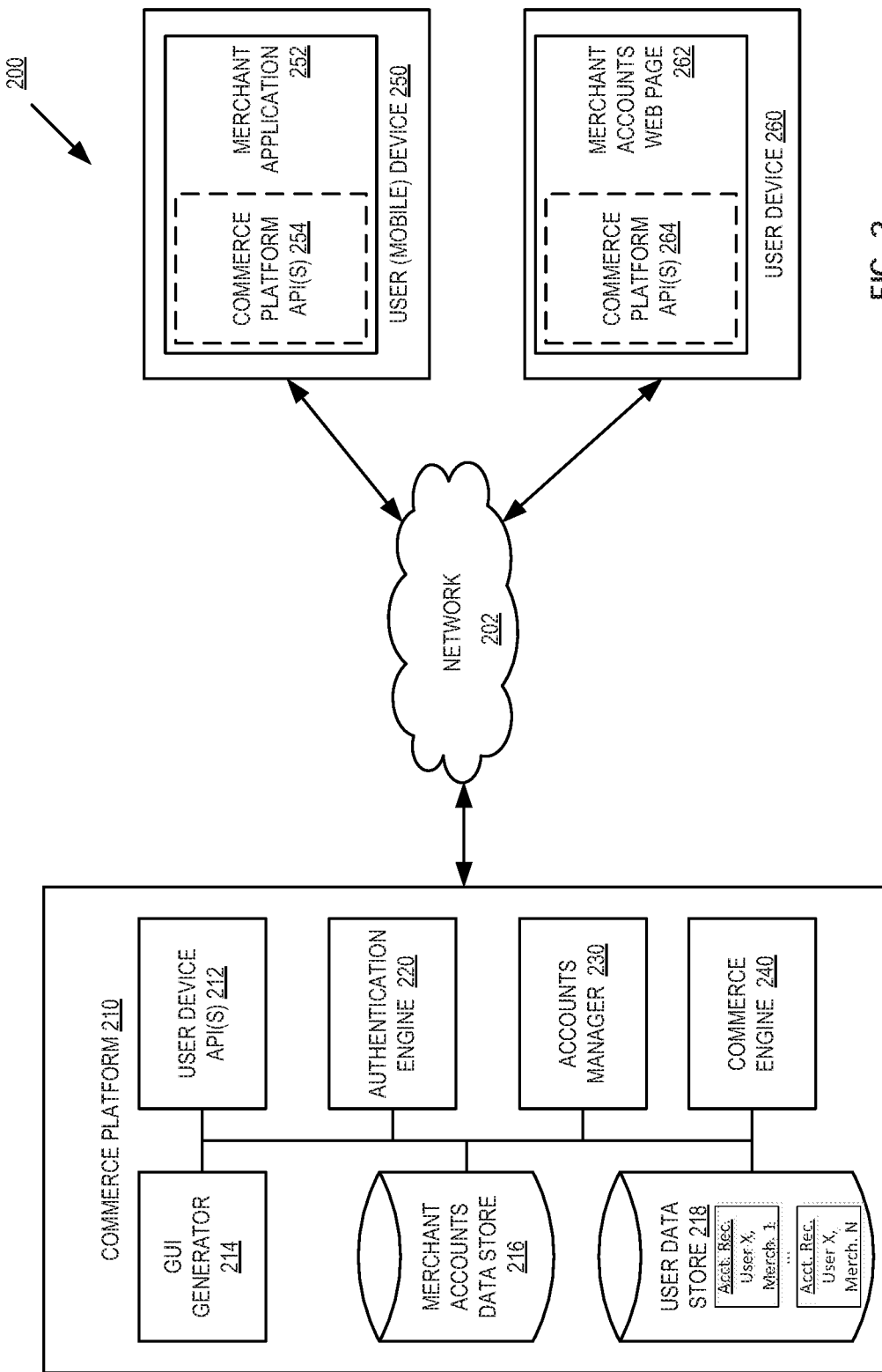
FIG. 2 is a block diagram of one embodiment of a commerce platform that authenticates a user commerce account using one or more user device(s).

FIG. 2 is a block diagram of one embodiment 200 of a commerce platform 210, a user mobile device 250, and a user device 260. Commerce platform 210, user mobile device 250, and user device 260 provide additional details for the corresponding devices/systems discussed above in FIG. 1.

In one embodiment, commerce platform includes one or more user device application programming interfaces (APIs) 212, a graphical user interface generator (GUI) 214, an authentication engine 220, an accounts manager 230, a commerce engine 240, a merchant accounts data store 216, and a user data store 218. User mobile device 250 includes a merchant application 252 integrated with one or more commerce platform APIs 254, and user device 260 includes a merchant accounts web page 262 integrated with one or more commerce platform APIs 264. As discussed above, one or more of mobile device 250 and/or user device 260 will establish a user account with commerce platform 210 to enable the user of mobile device 250 to receiving payments from consumers for services and/or provide products provided on behalf of a merchant (e.g., merchant system 120). Furthermore, in one embodiment, the commerce platform 210, user mobile device 250, and user device 260 communicate with each other over various networks and network configurations as discussed above in FIG. 1.

Merchant application 252 executing in user mobile device 250 is responsible for receiving a request to establish and/or update a user account at commerce platform on behalf of a merchant system (e.g., merchant system 120). In embodiments, the user account is to be associated with a particular user mobile device, such as user mobile device 250, and can include adding a new user account associated with a merchant system, updating a user's information for an existing user account already associated with a merchant system, or associating information in an existing user account with a new merchant system. In one embodiment, the commerce platform APIs 254 detect the request and pass the request on to user device APIs 212 of commerce platform 210. In an alternative embodiment, the user account establishment request may also be initiated through merchant accounts web page 262, and communicated to the commerce platform via commerce platform APIs 264. In either embodiment, the commerce platform APIs (e.g., 254 or 264) establish communication and exchange information with the APIs (e.g., 212) of commerce platform for authenticating a user account. Furthermore, some information, such as an identification of the merchant system associated with application 252 or web page 262 are also passed to commerce platform to enable the user account to be associated with the appropriate merchant system.

Upon receiving the request to authenticate a user account at the commerce platform 210, GUI generator 214 supplies a user interface to user mobile device 250 or user device 260. In one embodiment, the user interface generated by GUI generator 214 may be a web based user interface that redirects user device 250 or 260 from the merchant user interface to the commerce platform's 210 user interface. That is, the supplied user interface of commerce platform 210 controls and alters the display of the user device 260 and/or user device 250 while performing the account authentication and establishment process.

In one embodiment, authentication engine 220 utilizes the generated commerce platform's user interface to perform an authentication process for the new/updated user account. Authentication engine 220 requests initial authentication information from the user, with the request being displayed in a commerce platform user interface at user mobile device 250 or user device 260.

When authentication engine 220 receives a response with the initial authentication information from the user, authentication engine will attempt to authenticate the user's mobile device 250 as belonging to the user seeking authentication to commerce platform 210. In one embodiment, the authentication information may include requests for user information, such as a mobile phone number of the user mobile device 250, a cookie indicating a prior state of the mobile device known to commerce platform 210, a security key of the user, a third party identity validation, etc. Each of these forms of authentication information can be used by authentication engine 220 to confirm that the user seeking to establish/update a user account at commerce platform 210 is the actual authorized user of user mobile device 250 (e.g., the user and device that will be used to perform transaction on behalf of the merchant).

Figure 8A:
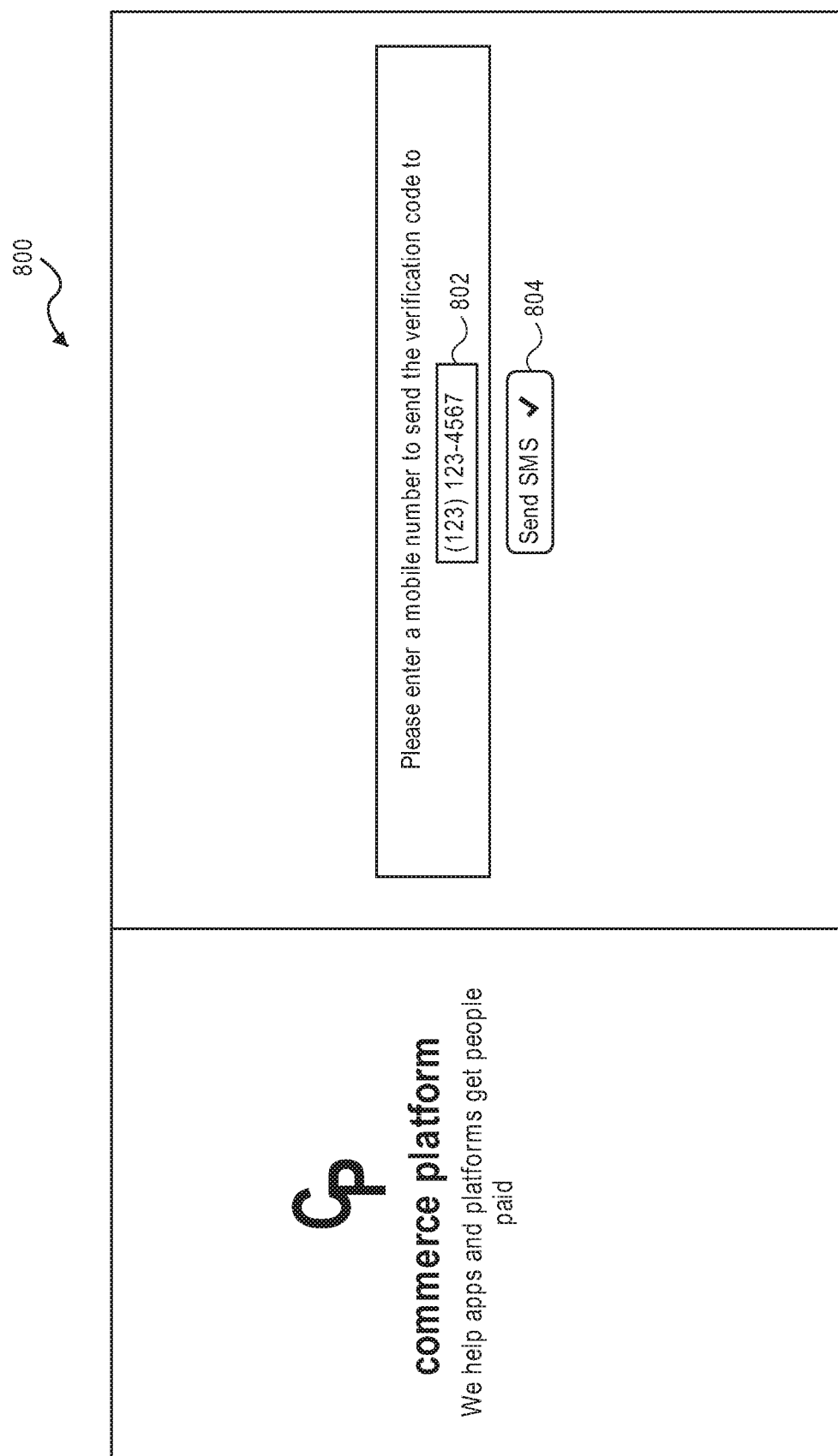
FIGS. 8A-15 illustrate graphical user interfaces generated by a commerce platform during authentication of a user commerce account associated with a merchant of the commerce platform.
Figure 8B:
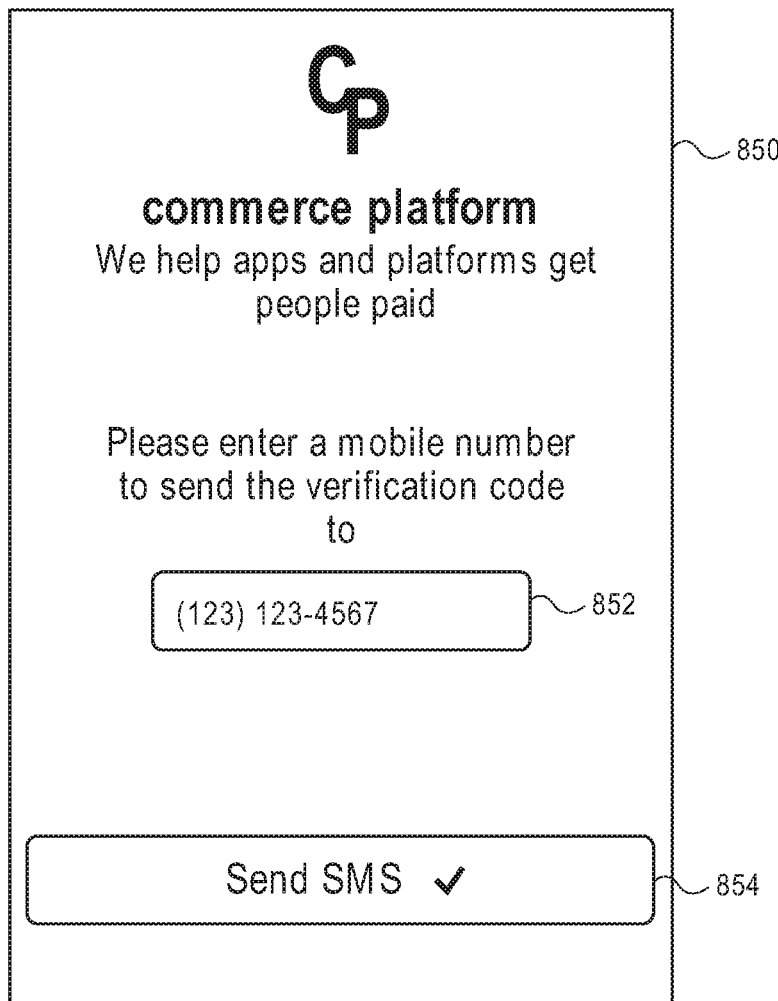

One exemplary form of user authentication information includes a user's purported mobile phone number. FIG. 8A illustrates one embodiment of a web based user interface 800 that authentication engine 220 causes to be displayed on user device 260, when the user account authentication process is initiated at user device 260. FIG. 8B illustrates one embodiment of a mobile web based user interface 850 that authentication engine 220 causes to be displayed on user mobile device 250, when the user account authentication process is initiated at user device 250. In either interface, the authentication engine may prompt the user to enter the phone number associated with user mobile device 250 in field 802 or 852. The web based application 800 or 850 sends the user entered phone number to the authentication engine upon user selection of a send button (e.g., send button 804 or 854).

Furthermore, in embodiments, when authentication information is available on user mobile device 250, merchant application 252, or a combination, the user interface of commerce platform 210 may request and automatically receive such information from the user mobile device 250 without requiring any actions on the user's behalf. For example, where a user account already exists in user data store 218, the user account may include a cookie indicative of a known prior device state of the user mobile device 250. During the initial exchange of information between commerce platform APIs 254 and user device APIs 212, authentication engine 220 may acquire a cookie from user mobile device 250 for comparison with the cookie in user data store 218 in an attempt to authenticate the user.

Figure 9A:
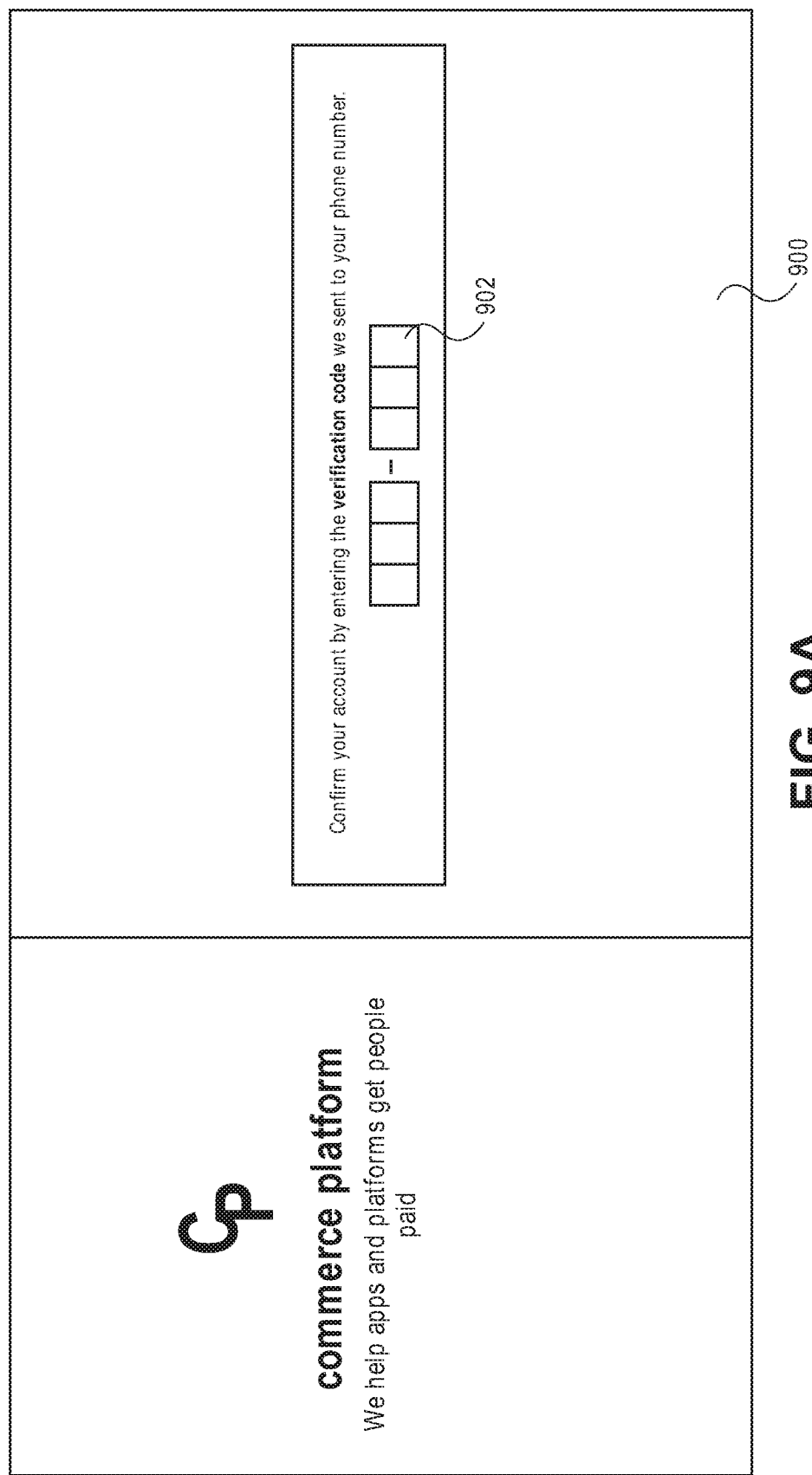
Figure 9B:
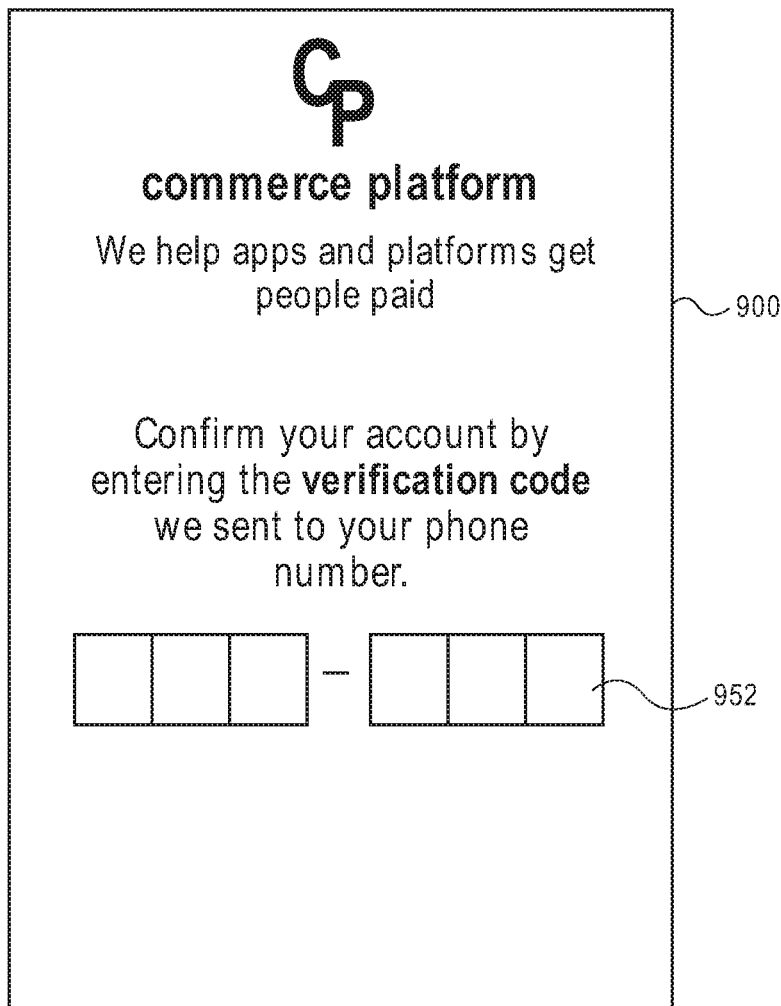

Authentication engine 220 receives responses to the initial authentication request(s) (e.g., mobile phone number, cookie, security key, etc.) and performs the authentication process by sending one or more challenges based on the responses. For example, when a mobile phone number is provided by the user, authentication engine 220 will respond with a verification code sent by, for example, text message, multimedia message, telephone call, etc., to the indicated telephone number. Upon sending the verification code to the entered mobile phone number, the commerce platform user interface (displayed either at user mobile device 250 or user device 260) may be updated to prompt the user for entry of the verification code. For example, FIG. 9A illustrates commerce platform user interface 900 that enables verification code entry 902 at user device 260. Similarly, FIG. 9B illustrates commerce platform user interface 950 enabling verification code entry 952 at user mobile device 250. Upon authentication engine 220 detecting the entry of the sent verification code, authentication engine is able to conclude that the user seeking registration of a user account at commerce platform 210 is also the user who owns/possesses user mobile device 250 that will be conducting financial transactions through commerce platform 210 on behalf of a merchant system.

In one embodiment, upon successfully authenticating a user and device, authentication engine 220 generates one or more authentication keys, such as a randomly generated encryption key, a unique hash value generated based on user account information, etc., that are provided to user mobile device 250. Commerce platform APIs 254 receive the authentication key(s) and store them for later use by the merchant application 252 when authenticating the user mobile device 250 to commerce platform 210 during a financial transaction performed with commerce engine 240.

Figure 10A:
Figure 10B:
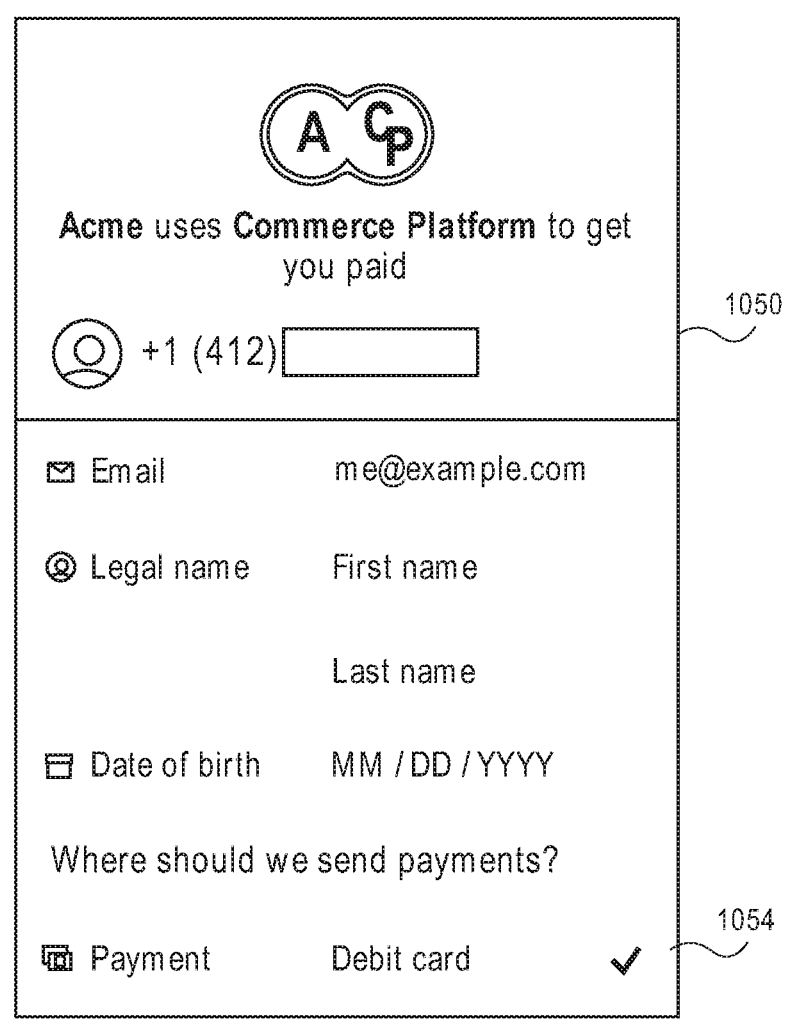

In one embodiment, upon authentication engine 220 successfully authenticating a user and mobile device for a new/updated user account (e.g., determining that the user and their mobile device are legitimate), accounts manager 230 causes GUI generator 214 to generate a user interface for display by either user mobile device 250 or user device 260 for collecting additional user account details. FIGS. 10A and 10B illustrate user interfaces for collecting user account details. In one embodiment, the user interfaces 1000 and 1050 include fields 1002 and 1052 for collecting user personal information (e.g., a user's legal name, address, alternative phone number, email address, etc.). Furthermore, the user interfaces 1000 and 1050 also include fields 1004 and 1054 for collecting user financial remuneration information (e.g., bank account information, debit card information, digital asset account information, etc.). Accounts manager 230 then stores the account information in user data store 218 as a user account record associated with a particular merchant. In one embodiment, the user's account information may first be encrypted, or otherwise protected, before storage in user data store 218 to protect sensitive user information. Furthermore, the merchant accounts data store 216, which stores similar merchant information (e.g., merchant contact information, merchant financial remuneration information, tax information, etc.), may also be updated with information indicating that the user who has just been authenticated is associated with a particular merchant system.

Figure 11A:
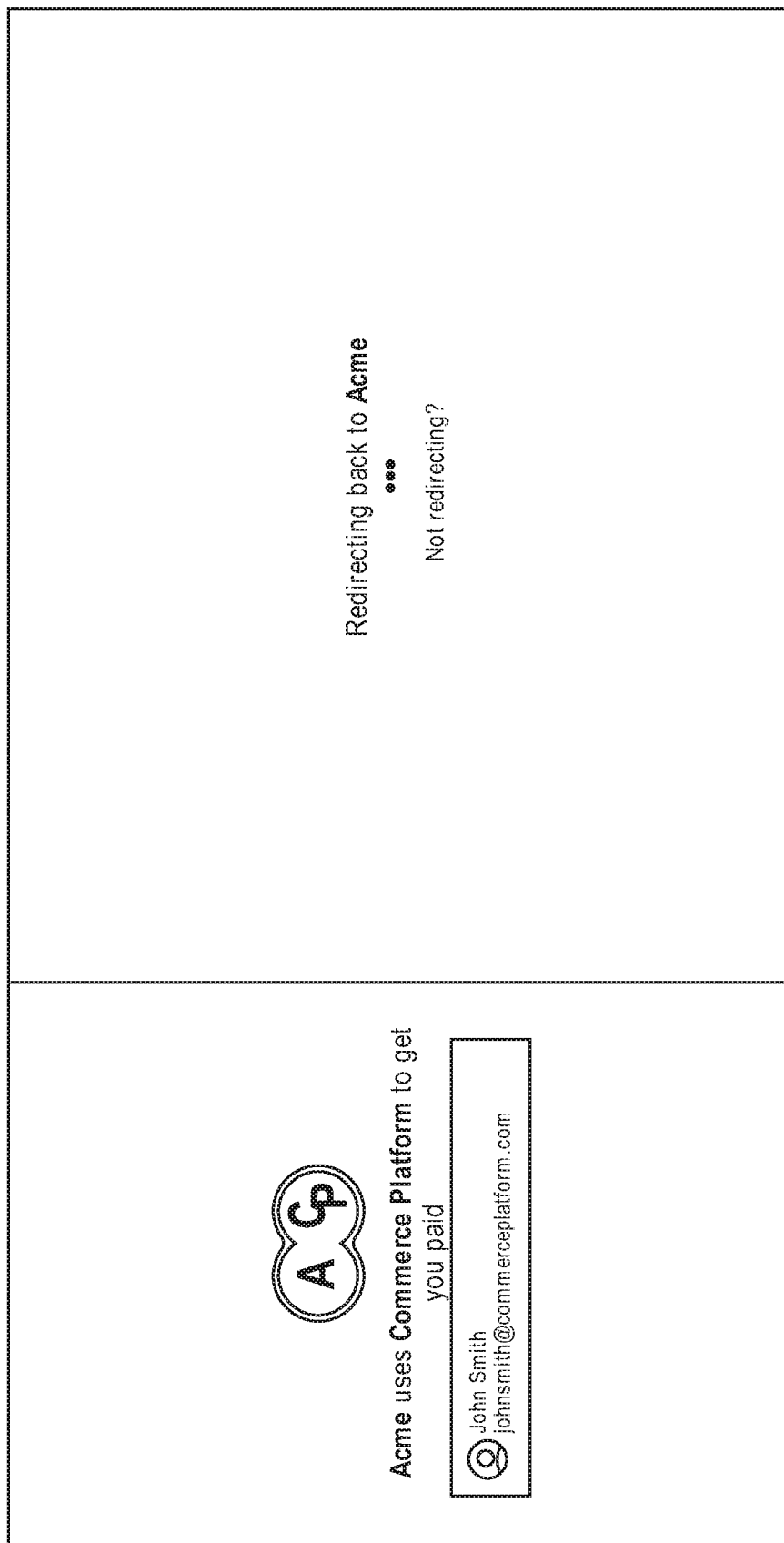
Figure 11B:
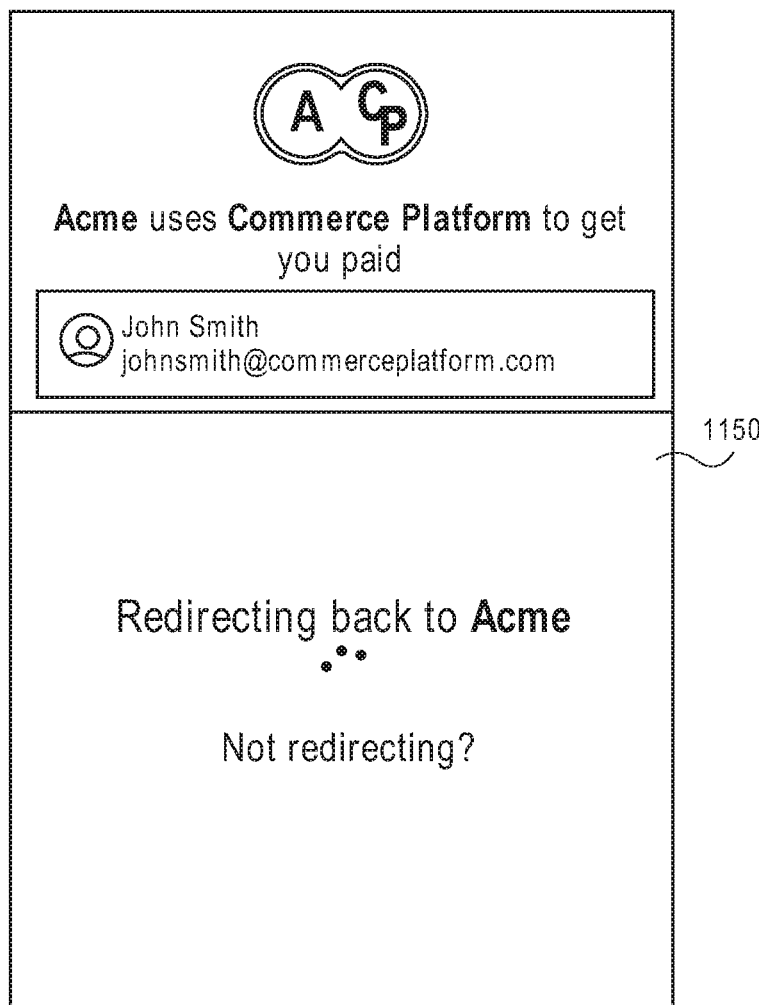

After authentication has been completed, and the authentication key(s) provided to user mobile device 250, user device APIs 212 redirect user mobile device 250 or user device 260 back to the merchant application 252 or merchant accounts web page 262. FIGS. 11A and 11B illustrate a redirection user interface 1100 displayed on user device (e.g., user device 260), and a redirection user interface 1150 displayed on user mobile device (e.g., user device 250). In one embodiment, the redirection causes user mobile device 250 and user device to return to the display of the merchant application 252 or merchant accounts web page, respectively, and based on which device the user performed the account authentication on.

After redirection to the merchant application 252 or merchant accounts web page 262, the user is able to perform transactions as an agent of the merchant system. For example, merchant application 252 may collect payment from a consumer for a good or service supplied by a user of user mobile device 250 to the consumer on behalf of a merchant system. The payment information could be submitted, e.g., via APIs 254, to commerce platform along with the authentication key generated by authentication engine 220. Upon commerce engine verifying the identity of the user of user mobile device 250, commerce engine 240 processes the received payment information, including paying out a user based on their account information stored in user data store 218, and paying out a merchant system based on their account information stored in merchant accounts data store 216.

In embodiment discussed herein, the authentication of the user account by the commerce platform is an efficient and easy process for the user of user mobile device 250. That is, the user is authenticated as the actual user of a particular mobile device quickly through one or more identify authentication factors (e.g., verification codes sent through text messages) by the commerce platform 210, so that the user may begin acting on behalf of the merchant, accept payments from merchant customers, and receiving payouts for provided products/services. Furthermore, the authentication process is streamlined so that minimal information is collected to authenticate the user of a particular mobile device before collecting additional user account information.

Figure 3:
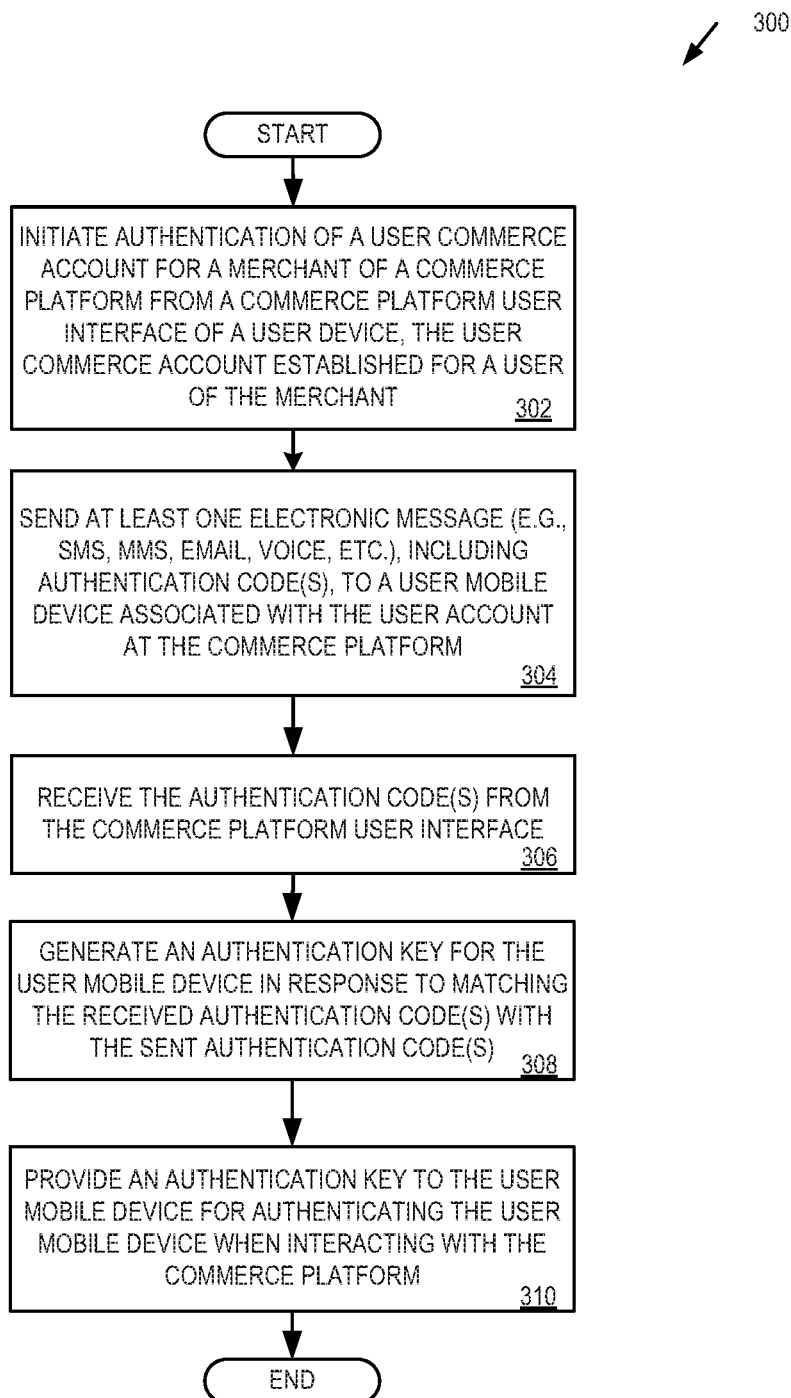
FIG. 3 is a flow diagram of one embodiment of a method for authenticating a user commerce account associated with a merchant of a commerce platform.

FIG. 3 is a flow diagram of one embodiment of a method 300 for authenticating a user commerce account associated with a merchant of a commerce platform. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform (e.g., commerce platform 110 or 210).

Referring to FIG. 3, processing logic begins by initiating the authentication of a user account for a merchant of a commerce platform from a commerce platform user interface of a user device, the user account established for an agent of the merchant (processing block 302). As discussed herein, the user account authentication is initiated when a user that provides services and/or products on behalf of a merchant attempts to establish a new account, update an existing account, be associated with a new merchant, etc. within a merchant system user interface of a merchant application. Processing logic receives notification that the authentication of the user account has been initiated by the exchange of messages between processing logic and the merchant application, and initiates the authentication of the user account by causing a user device to display the commerce platform user interface. In embodiments, the commerce platform user interface may be displayed on either a mobile computing device (e.g., smartphone, tablet computer, etc.) or a traditional computing device (e.g., a desktop computer system, laptop computer system, etc.).

Processing logic sends at least one electronic message (e.g., SMS, MMS, email, voice, etc.) including authentication code(s), to a user mobile device associated with the user account at the commerce platform (processing block 304). In one embodiment, the authentication codes are sent to the user mobile device based on information received at the commerce platform, through a different communication channel from that providing the commerce platform user interface. For example, the commerce platform may receive a user's mobile phone number via a commerce platform user interface, for authenticating the mobile device associated with the mobile phone number for a user commerce platform account. Processing logic could use the received mobile phone number as the destination where the authentication codes are sent via text message through a different communication channel, such as a telecommunications network.

Processing logic receives the authentication code(s) from the commerce platform interface (processing block 306). In one embodiment, the authentication codes are entered into the commerce platform user interface, and transmitted from the commerce platform user interface to the processing logic of the commerce platform.

Processing logic generates an authentication key for the user mobile device in response to matching the received authentication code(s) with the sent authentication code(s) (processing block 308). That is, continuing the example above, processing logic attempts to verify that the mobile phone number to which the authentication codes were sent, belongs to the phone being registered/associated with a user commerce platform account. When the received codes match the sent codes, it can be assumed that the same person who is attempting to register for a commerce platform user account is also the mobile device owner. In one embodiment, a cookie may be provided by the commerce platform back to the mobile device that is indicative of the matching of the sent and received authentication codes (e.g., a device state indicating that the device provided a matching authentication code). A period of validity of the cookie, such as 1 hour, 2 hours, 24 hours, etc., may also be specified within the data of the cookie, or maintained by commerce platform. In one embodiment, processing logic may also receive and utilize the cookie/other data, along with the authentication code matching, to perform multi-factor authentication of the user and/or user device attempting to register for the commerce platform user account.

Processing logic then provides an authentication key to the user mobile device for authenticating the user mobile device when interacting with the commerce platform (processing block 310). In embodiments, when the user mobile device performs transactions with the commerce platform on behalf of a merchant, the authentication key is a factor used by the commerce platform to verify and authenticate the purported identity of the party (e.g., mobile device and associated user) performing the transaction. Furthermore, in embodiments, the authentication key may be required to access and/or decrypt user account information maintained at the commerce platform, for purposes of processing a transaction, and for paying the user associated with the user account (e.g., crediting a debit card, depositing funds into a bank account, depositing funds into a digital asset account, etc.).

Figure 4:
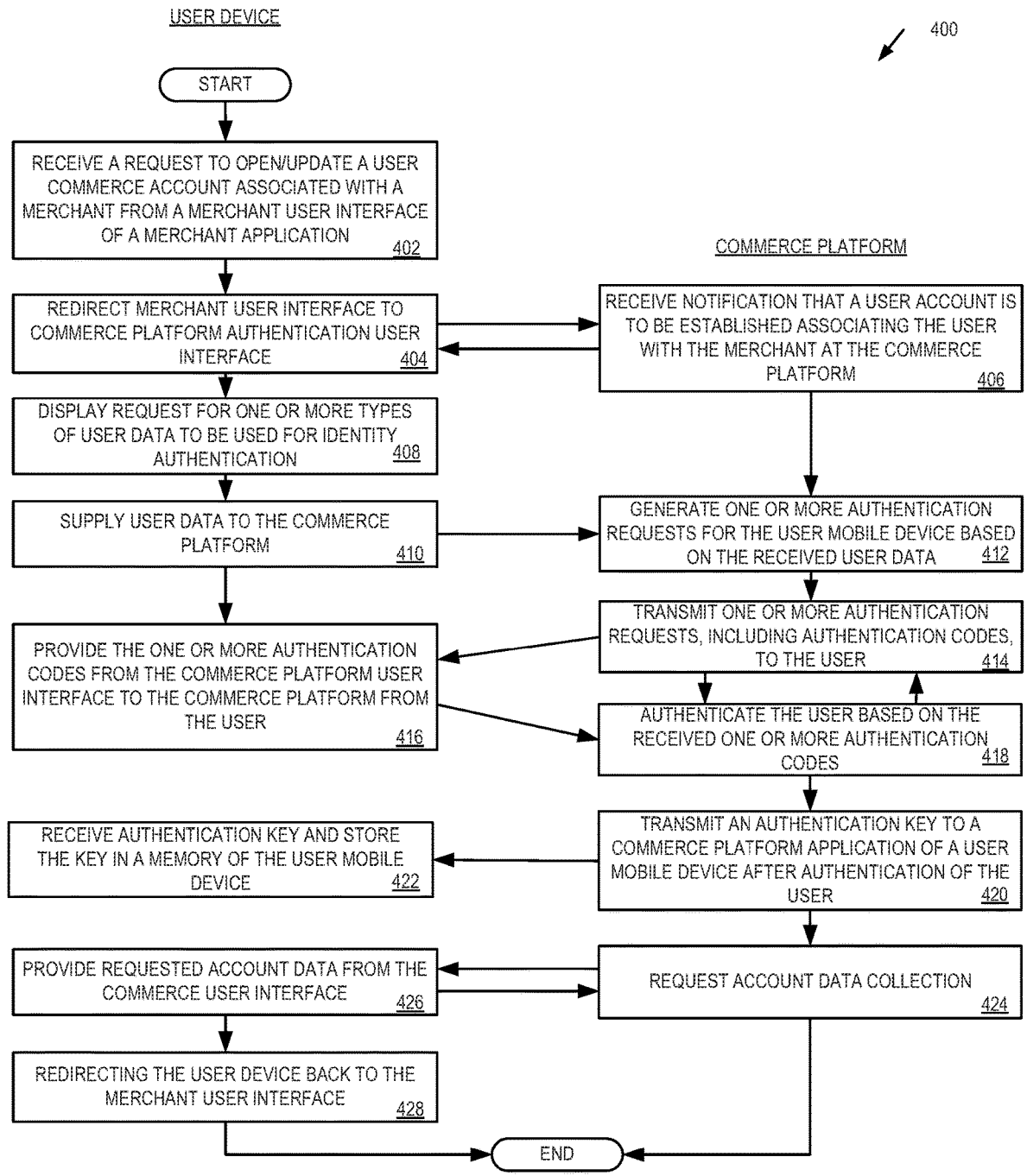
FIG. 4 is a flow diagram of one embodiment of a method for a user device interacting with a commerce platform to authenticate a user commerce account associated with a merchant.

FIG. 4 is a flow diagram of one embodiment of a method 400 for a user device interacting with a commerce platform to authenticate a user commerce account associated with a merchant. The method 400 is performed by processing logic that may comprise hardware (circuitry, dedicated logic, etc.), software (such as is run on a general purpose computer system or a dedicated machine), firmware, or a combination. In one embodiment, the method 300 is performed by a commerce platform (e.g., commerce platform 110 or 210) and a user device (e.g., user device 130-1, 130-2, 250, and/or 260).

Referring to FIG. 4, processing logic of a user device receives a request to open/update a user commerce account associated with a merchant from a merchant user interface (processing block 402). As discussed herein the user commerce account will enable the user of the user device to conduct financial transactions for services performed and/or products provided to a customer of the merchant. For example, the merchant may be a food delivery service, and the user of the mobile device is a delivery person that performs food pick-up and delivery for customers that ordered food through the merchant. As another example, the merchant may be a transportation service, and the user of the device operates a motor vehicle that will transport a customer of the merchant.

The merchant user interface displayed by the user device is redirected to a commerce platform authentication user interface (processing block 404). In one embodiment, one or more commerce platform APIs of a merchant application responsible for generating the merchant user interface perform the redirection. In another embodiment, upon receiving notification that a user account is to be established associating the user with the merchant at the commerce platform (processing block 406), the commerce platform could send a commerce platform user interface, such as a web based interface, that causes the redirection at processing block 404.

Processing logic of the user device displays a request in the authentication interface for one or more types of user data to be used for identity authentication (processing block 408). As discussed herein, the user data can include a telephone number of the user device, a telephone number of a different user device to be used during transactions with the commerce platform, a security key, a third party verification, etc. Processing logic supplies the user data to the commerce platform (processing block 410).

Processing logic of the commerce platform, in response to receipt of the user data, generates one or more authentication requests, including authentication codes, for the user mobile device based on the received user data (processing block 412), which are provided to the user device. The user device provides the one or more authentication codes from the commerce platform user interface to the commerce platform from the user (processing block 416). Processing logic of the commerce platform is then able to authenticate the user based on the received authentication codes (processing block 418). In one embodiment, the commerce platform matches the sent authentication codes to the received authentication codes. Furthermore, processing logic can return to processing block 414 if an invalid code was received, or when further authentication of a potential user/user device is desired, thereby providing multiple authentication factors.

After successful authentication at processing block 418, processing logic of the commerce platform transmits an authentication key to a commerce platform application of a user mobile device after authentication of the user (processing block 420). The key, in embodiments, may be an encryption key, a hash value computed from user information, etc. The user device receives and stores the key in a memory of the user device (processing block 422).

Figure 5:
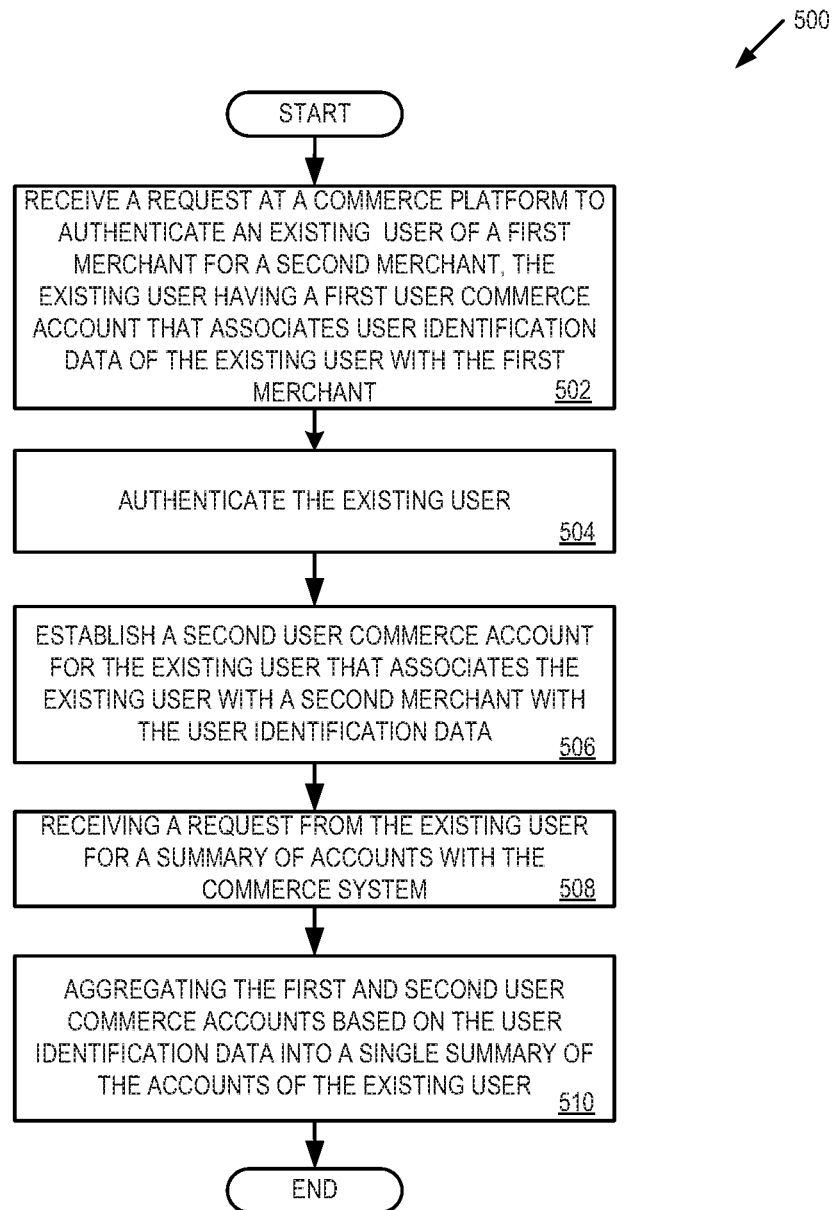
FIG. 5 is a flow diagram of one embodiment of a method for enabling multiple commerce platform accounts associated with different merchants for a user.

After the key has been exchanged, processing logic of the commerce platform can request additional account data collection (processing block 424), such as user name, address, email address, social security number, driver's license number, etc., as well as information needed to pay a user, such as bank account information, debit information, etc. The commerce platform request can include providing a new user interface, that causes user device to display the requests for the information. User device then provides the requested information through the provided interface to commerce platform (processing block 426). After the requested information is collected, the commerce platform user interface is redirected back to the merchant user interface of the merchant application (processing block 428). In embodiments, the merchant application, the commerce platform, or a combination can cause the redirection of the user interface back to the merchant user interface FIG. 5 is a flow diagram of one embodiment of a method 500 for enabling multiple commerce platform accounts associated with different merchants for a user. The method 500 is performed by processing logic that may comprise hardware (circuitry, dedicated logic, etc.), software (such as is run on a general purpose computer system or a dedicated machine), firmware, or a combination. In one embodiment, the method 500 is performed by a commerce platform (e.g., commerce platform 110 or 210).

Figure 12A:
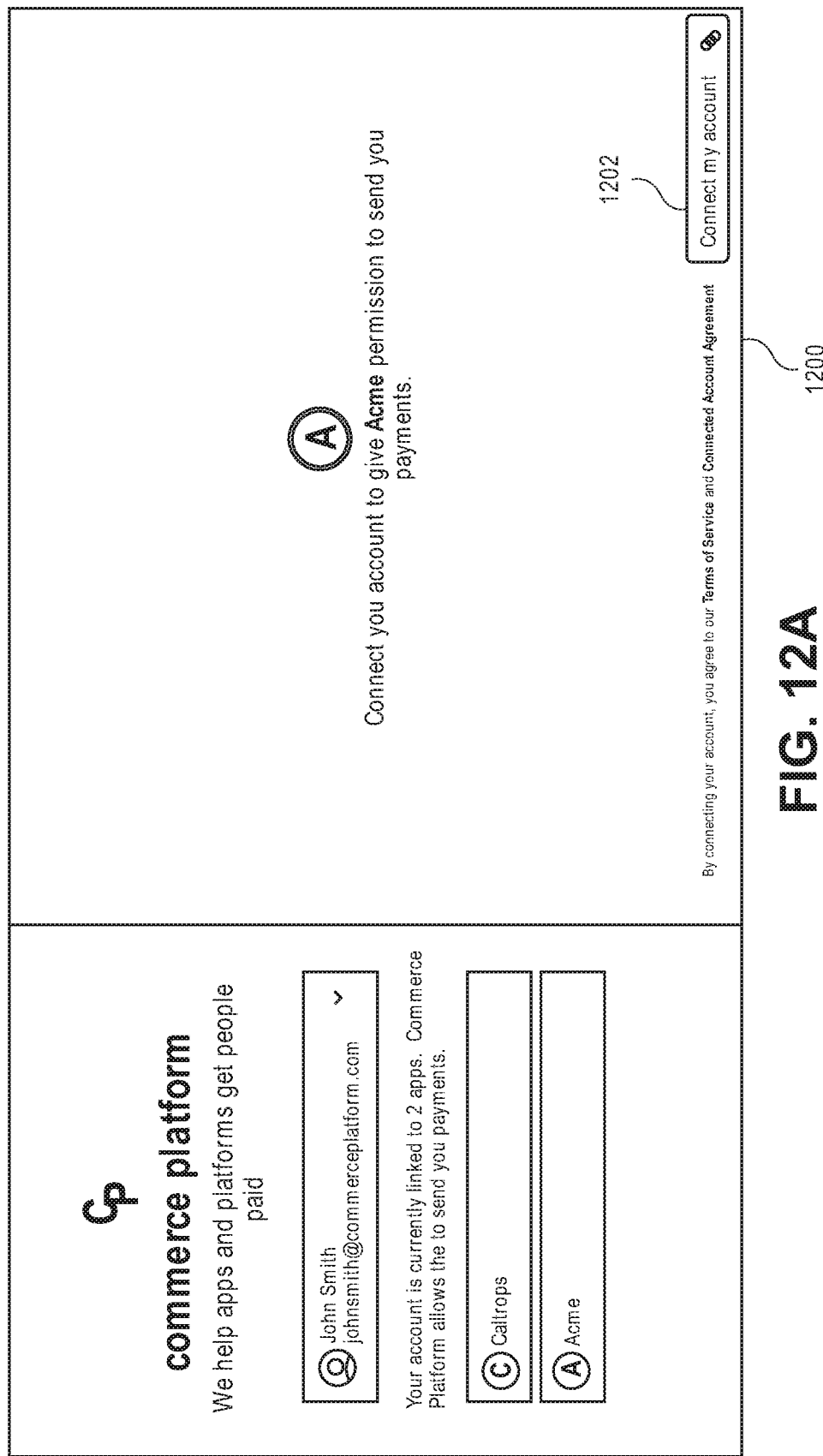
Figure 12B:
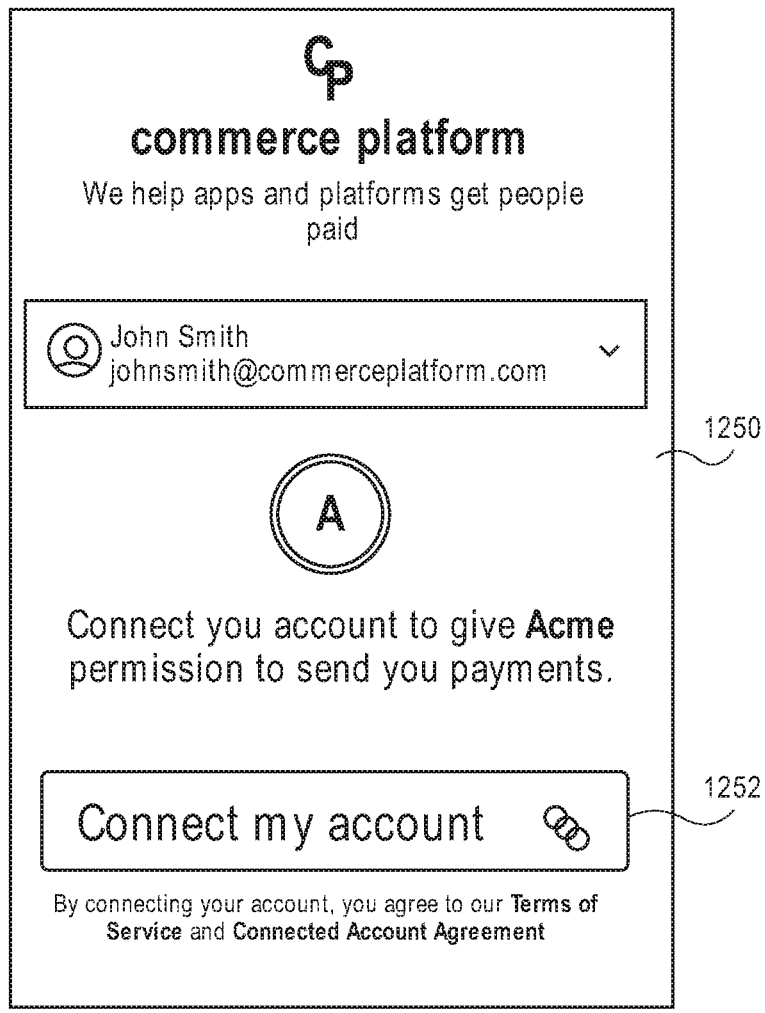
Figures 13, 14:
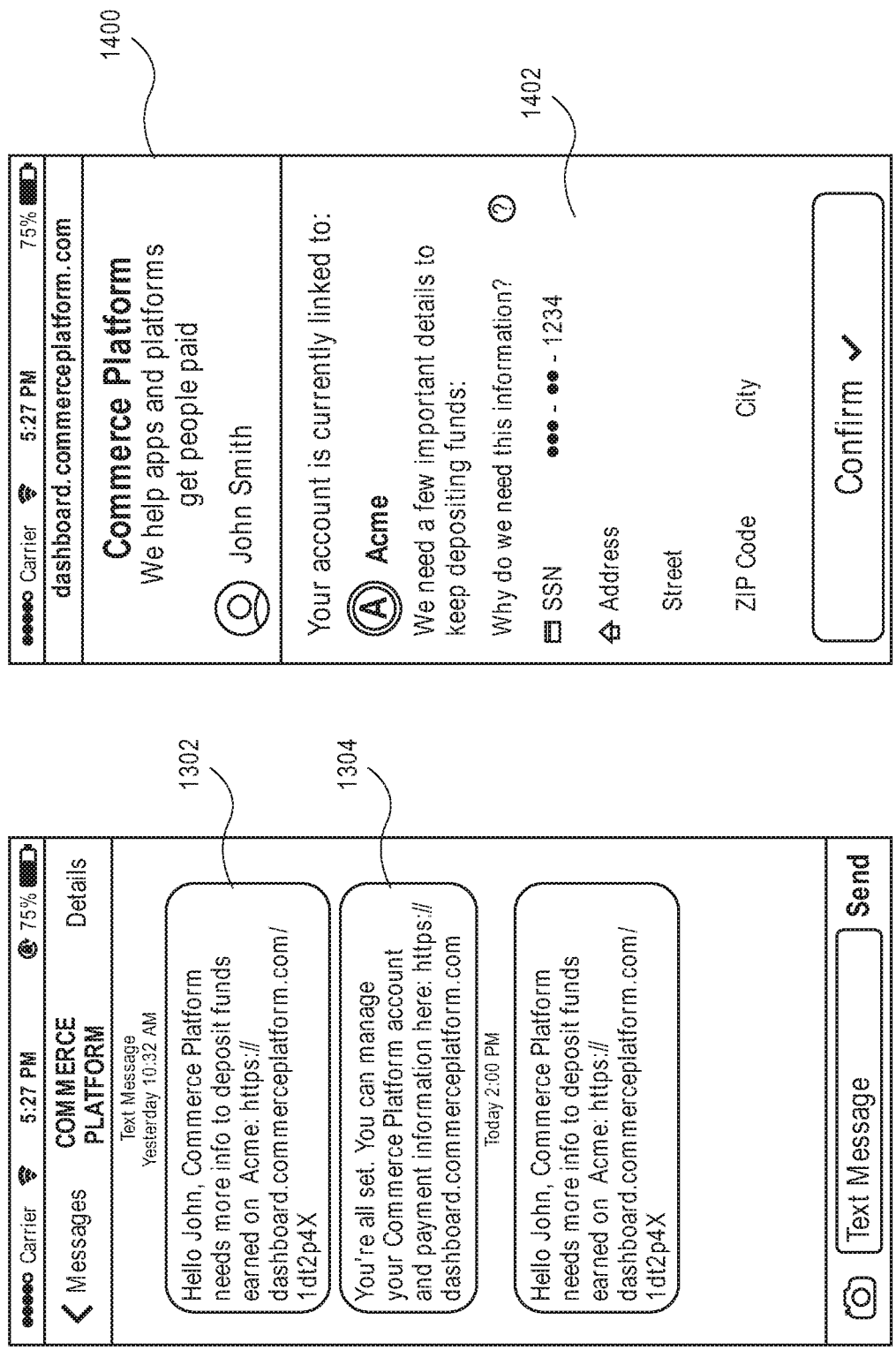

Referring to FIG. 5, processing logic begins by receiving a request at a commerce platform to authenticate an existing user for a second merchant, the existing user having a first user commerce account that associates the existing user with a first merchant (processing block 502). In embodiments, commerce platform enables the same user and mobile device to be associated with different merchants. That is, the user may be an agent of the first and second merchants simultaneously. However, commerce platform already has the user's account information, and thus processing logic may need not re-collect this information. Instead, in embodiments, processing logic will authenticate the user (to ensure proper user and device identity) and then connect the user account information to the second merchant. For example FIG. 12A illustrates a user interface 1200 that enables an existing user to connect 1202 their account to a new merchant. Similarly, FIG. 12B illustrates a mobile user interface 1250 that also enables an existing user to connect 1252 their account to a new merchant Processing logic authenticates the existing user (processing block 504). In one embodiment, the existing use is authenticated by the processing logic of the commerce platform using one or more of the multi-factor authentication techniques discussed herein. For example, a request for more information may be sent as a link in a text message 1302 to a user mobile device, as illustrated in FIG. 13, which causes a user mobile device to open a commerce application interface 1400 to input the requested information 1402, as illustrated in FIG. 14.

Figure 15:
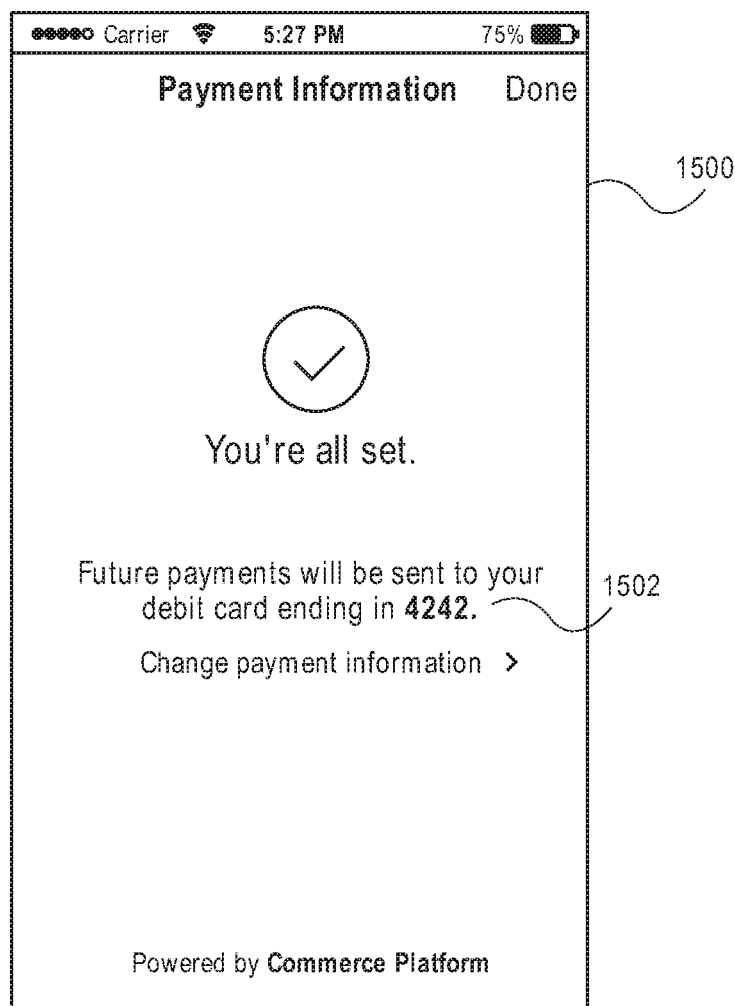

Processing logic establishes a second user commerce account for the existing user that associates the existing user's commerce platform account information with a second merchant (processing block 506). In one embodiment, the commerce platform does not comingle or combine accounts between merchants. Therefore, in one embodiment, the commerce platform may duplicate the user account information (e.g., name, phone number, email, banking information, etc.) to a new record in the user data store 218 of FIG. 2, so that the same user has different account records for different merchants. In one embodiment, once the account records have been created, and all information is received, the user may be provided with a confirmation, such as the confirmation interface 1500 illustrated in FIG. 15, or the confirmation text message 1304 illustrated in FIG. 13.

Processing logic may further receive a request from the existing user for a summary of accounts with the commerce platform (processing block 508). That is, after a user has established multiple accounts, they may desire to obtain an overall picture of their accounts, such as total payouts from all accounts, payouts per account, etc. that are maintained by the commerce platform. In response to the request, processing logic aggregates the first and second user commerce accounts based on the user identification data into a single summary of the existing user (processing block 510). In one embodiment, processing logic utilizes user identification records to find the first and second (and third, fourth, etc.) accounts in the user data store 218 of FIG. 2, and combines them into the aggregated reporting. In one embodiment, the aggregated reporting can separate the merchant specific information (e.g., payments received by each merchant) and/or provide combined information (e.g., total of all payments received).

Figure 6:
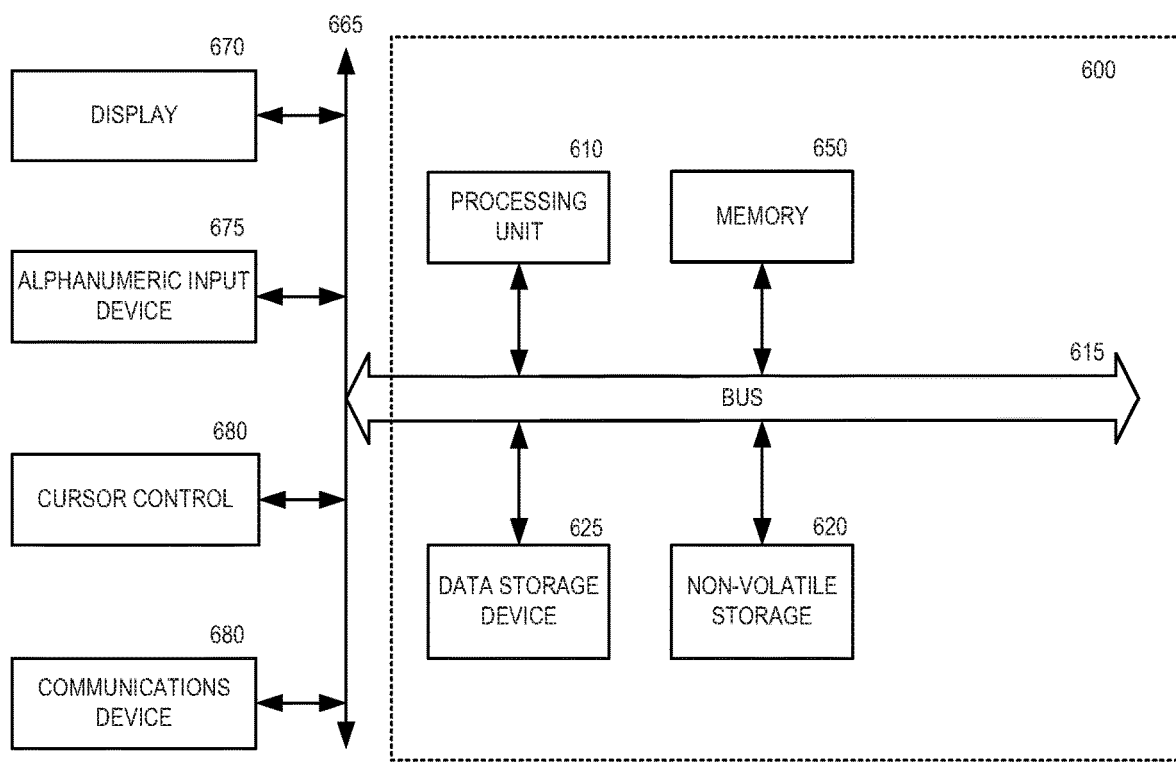
FIG. 6 is one embodiment of a computer system that may be used to support the systems and operations discussed herein.

FIG. 6 is one embodiment of a computer system that may be used to support the systems and operations discussed herein. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
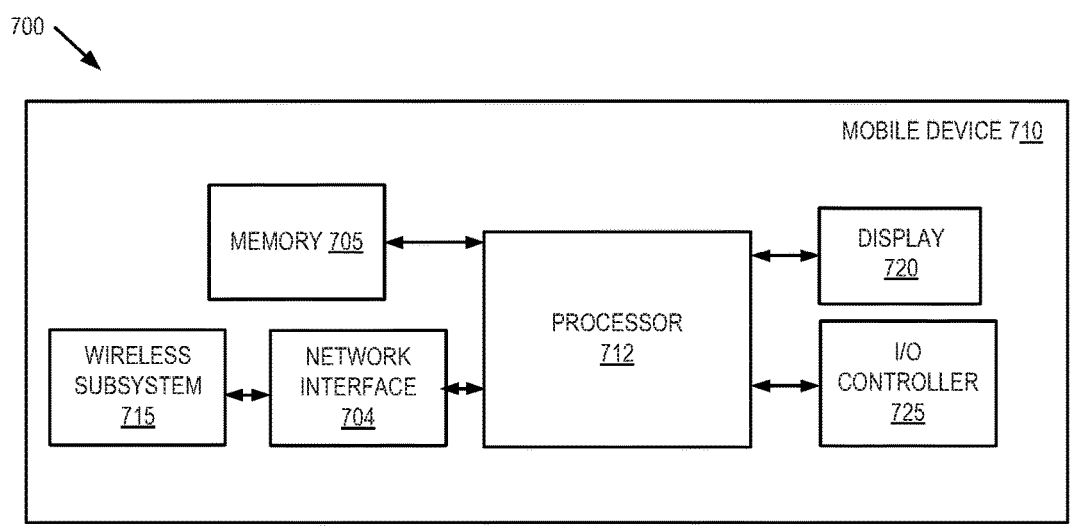
FIG. 7 is one embodiment of a mobile device that may be used to support the systems and operations discussed herein.

FIG. 7 is block diagram of one embodiment 700 of a mobile device. Mobile device 710 provides additional details for mobile devices discussed above in FIGS. 1 and 2.

In one embodiment, mobile device 710 is a system, which may include one or more processors 712, a memory 705, I/O controller 725, network interface 704, and display 720. Mobile device 710 may also include a number of processing modules, which may be implemented as hardware, software, firmware, or a combination. It should be appreciated that mobile device 710 may also include, although not illustrated, a user interface (e.g., keyboard, touch-screen, or similar devices), a power device (e.g., a battery), as well as other components typically associated with electronic devices. Network interface 704 may also be coupled to a number of wireless subsystems 715 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 704 and wireless subsystem 715 couple mobile device 710 to a network.

Memory 705 may be coupled to processor 712 to store instructions for execution by processor 712. In some embodiments, memory 705 is non-transitory. It should be appreciated that embodiments as described herein may be implemented through the execution of instructions, for example as stored in the memory 705 or other element, by processor 712 of mobile device 710 and/or other circuitry of mobile device 710 and/or other devices. Particularly, circuitry of mobile device 710, including but not limited to processor 712, may operate under the control of a program, routine, or the execution of instructions to execute methods or processes in accordance with the embodiments described herein. For example, such a program may be implemented in firmware or software (e.g. stored in memory 705 and/or other locations) and may be implemented by processors, such as processor 712, and/or other circuitry of mobile device 710. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 710 itself and/or some or all of the functions, engines or modules described herein may be performed by another system connected through I/O controller 725 or network interface 704 (wirelessly or wired) to mobile device 710. Thus, some and/or all of the functions may be performed by another system and the results or intermediate calculations may be transferred back to mobile device 710. In some embodiments, such other device may comprise a server, such as commerce platform 110 or 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for authenticating a user account associated with a second server system that uses services of a first server system, the method comprising:
   rendering, on a user device of a user, a user interface for associating the user device with the user account at the first server system;
   transmitting, by the user interface to the first server system over a first communications channel, a first electronic message causing the first server system to initiate authentication of the user account by sending a second electronic message over a second communications channel to a user mobile device, the second electronic message comprising an authentication code generated by the first server system;
   transmitting, by the user interface to the first server system over the first communications channel, a third electronic message comprising: (i) the authentication code entered into the user interface causing the first server system to authenticate the authentication code by determining whether the transmitted authentication code matches the authentication code sent to the user mobile device, and (ii) a cookie causing the first server system to authenticate the cookie by matching data within the cookie with data known to the first server system; and
   receiving, by the user interface from the first server system in response to a successful authentication of the authentication code and the cookie, a fourth electronic message comprising an authentication key for authentication of the user device on behalf of the user account when interacting with an application associated with the second server system.

2. The method of claim 1, wherein prior to transmitting the first electronic message causing the initiation of the authentication of the user account further, the method further comprises:
   performing, by the user device, a first redirection of an initial user interface of the application associated with the second server system rendered on the user device to the user interface in response to a request to open or update the user account associated with the second server system for the user transmitted from the initial user interface displayed by the user device; and
   performing, by the user device, a second redirection back to the initial user interface of the second server system application after the authentication key is received from the first server system.

3. The method of claim 1, wherein prior to receipt of the second electronic message sent to the user mobile device, the method further comprises:
  rendering, by the user interface, a request to enter a mobile number purported to be for the user mobile device;
  transmitting, by the user interface to the first server system, the mobile number entered into the user interface, wherein entry of the mobile number causes the first server system to transmit a text message that includes the authentication code to the mobile number; and
  using, by the user interface, an authentication code entered into the user interface as the authentication code in the third electronic message.

4. The method of claim 1, wherein the user is an existing user of the first server system, further comprising:
  causing the authentication of the user account for the existing user of the first server system, wherein the existing user has a second user account associated with a second merchant of the first server system prior to initiation of the authentication; and
  transmitting the third electronic message for authenticating the existing user to the first server system for the second server system, wherein separate records for the existing user are maintained at the first server system for the user account and the second user account.

5. The method of claim 4, further comprising:
  transmitting, from the user interface to the first server system, a request for a summary of accounts associated with the existing user at the first server system;
  receiving, by the user interface from the first server system, a single accounts user interface based on an aggregation of the user account and the second user account by the first server system based on user identification data for the existing user in records for each of the user account and the second user account; and
  displaying, by the user interface, the single accounts user interface.

6. The method of claim 1, wherein the first server system provides one or more financial processing services in response to financial services requests received from the application associated with the second server system for a good or service supplied by the user to a consumer on behalf of the second server system, and wherein the first server system pays the user on behalf of the second server system based on the processing of provided financial processing services.

7. The method of claim 1, further comprising:
  receiving, by the user interface from the first server system after receiving the authentication key, data causing the user interface to render a request for collection of additional user data comprising user biographical information, user financial information, or a combination thereof;
  transmitting, from the user interface to the first server system, the additional user data entered into the user interface, causing the first server system to associate the additional user data with the user account at the first server system.

8. The method of claim 1, wherein the second electronic message comprises a short message service message, a multimedia messaging service message, or an electronic mail message.

9. The method of claim 1, wherein the user device is the user mobile device.

10. The method of claim 1, wherein the data within the cookie comprises data indicative of a prior state of the user device known to the first server system, data indicative of a prior matching of sent and received authentication codes, or a combination thereof.

11. A non-transitory computer readable storage medium having instruction stored thereon, which when executed by a processing system of a user device, causes the processing system to perform operations for authenticating a user account associated with a second server system that uses services of a first server system, the operations comprising:
  rendering, on a user device of a user, a user interface for associating the user device with the user account at the first server system;
  transmitting, by the user interface to the first server system over a first communications channel, a first electronic message causing the first server system to initiate authentication of the user account by sending a second electronic message over a second communications channel to a user mobile device, the second electronic message comprising an authentication code generated by the first server system;
  transmitting, by the user interface to the first server system over the first communications channel, a third electronic message comprising: (i) the authentication code entered into the user interface causing the first server system to authenticate the authentication code by determining whether the transmitted authentication code matches the authentication code sent to the user mobile device, and (ii) a cookie causing the first server system to authenticate the cookie by matching data within the cookie with data known to the first server system; and
  receiving, by the user interface from the first server system in response to a successful authentication of the authentication code and the cookie, a fourth electronic message comprising an authentication key for authentication of the user device on behalf of the user account when interacting with an application associated with the second server system.

12. The non-transitory computer readable storage medium of claim 11, wherein prior to transmitting the first electronic message causing the initiation of the authentication of the user account further, the operations further comprises:
  performing, by the user device, a first redirection of an initial user interface of the application associated with the second server system rendered on the user device to the user interface in response to a request to open or update the user account associated with the second server system for the user transmitted from the initial user interface displayed by the user device; and
  performing, by the user device, a second redirection back to the initial user interface of the second server system application after the authentication key is received from the first server system.

13. The non-transitory computer readable storage medium of claim 11, wherein prior to receipt of the second electronic message sent to the user mobile device, the operations further comprise:
  rendering, by the user interface, a request to enter a mobile number purported to be for the user mobile device;
  transmitting, by the user interface to the first server system, the mobile number entered into the user interface, wherein entry of the mobile number causes the first server system to transmit a text message that includes the authentication code to the mobile number; and using, by the user interface, an authentication code entered into the user interface as the authentication code in the third electronic message.

14. The non-transitory computer readable storage medium of claim 11, wherein the user is an existing user of the first server system, further comprising operations for:

causing the authentication of the user account for the existing user of the first server system, wherein the existing user has a second user account associated with a second merchant of the first server system prior to initiation of the authentication; and transmitting the third electronic message for authenticating the existing user to the first server system for the second server system, wherein separate records for the existing user are maintained at the first server system for the user account and the second user account.

15. The non-transitory computer readable storage medium of claim 14, further comprising operations for:

transmitting, from the user interface to the first server system, a request for a summary of accounts associated with the existing user at the first server system;

receiving, by the user interface from the first server system, a single accounts user interface based on an aggregation of the user account and the second user account by the first server system based on user identification data for the existing user in records for each of the user account and the second user account; and displaying, by the user interface, the single accounts user interface.

16. The non-transitory computer readable storage medium of claim 11, wherein the first server system provides one or more financial processing services in response to financial services requests received from the application associated with the second server system for a good or service supplied by the user to a consumer on behalf of the second server system, and wherein the first server system pays the user on behalf of the second server system based on the processing of provided financial processing services.

17. The non-transitory computer readable storage medium of claim 11, further comprising operations for:

receiving, by the user interface from the first server system after receiving the authentication key, data causing the user interface to render a request for collection of additional user data comprising user biographical information, user financial information, or a combination thereof; and transmitting, from the user interface to the first server system, the additional user data entered into the user interface, causing the first server system to associate the additional user data with the user account at the first server system.

18. The non-transitory computer readable storage medium of claim 11, wherein the second electronic message comprises a short message service message, a multimedia messaging service message, or an electronic mail message.

19. The non-transitory computer readable storage medium of claim 11, wherein the data within the cookie comprises data indicative of a prior state of the user device known to the first server system, data indicative of a prior matching of sent and received authentication codes, or a combination thereof.

20. A user device, comprising:

a memory; and a processor configured to perform operations, comprising:

render a user interface for associating the user device with a user account associated with a second server system that uses services of a first server system, transmit, by the user interface to the first server system over a first communications channel, a first electronic message causing the first server system to initiate authentication of the user account by sending a second electronic message over a second communications channel to a user mobile device, the second electronic message comprising an authentication code generated by the first server system, transmit, by the user interface to the first server system over the first communications channel, a third electronic message comprising: (i) the authentication code entered into the user interface causing the first server system to authenticate the authentication code by determining whether the transmitted authentication code matches the authentication code sent to the user mobile device, and (ii) a cookie causing the first server system to authenticate the cookie by matching data within the cookie with data known to the first server system, and receive, by the user interface from the first server system in response to a successful authentication of the authentication code and the cookie, a fourth electronic message comprising an authentication key for authentication of the user device on behalf of the user account when interacting with an application associated with the second server system.

* * * * *